Aug. 30, 1966 A. LUKREC 3,269,800
APPARATUS FOR AUTOMATICALLY PERFORMING CHEMICAL ANALYSES
Filed Feb. 5, 1963 3 Sheets-Sheet 2

INVENTOR.
ARON LUKREC
BY
Philip S. Hilbert
ATTORNEY.

Aug. 30, 1966     A. LUKREC     3,269,800
APPARATUS FOR AUTOMATICALLY PERFORMING CHEMICAL ANALYSES
Filed Feb. 5, 1963     3 Sheets-Sheet 3

INVENTOR.
ARON LUKREC

BY

*Philip S. Hilbert*

ATTORNEY.

United States Patent Office 3,269,800
Patented August 30, 1966

3,269,800
APPARATUS FOR AUTOMATICALLY PERFORMING CHEMICAL ANALYSES
Aron Lukrec, 434 Howard Ave., Staten Island, N.Y.
Filed Feb. 5, 1963, Ser. No. 256,465
8 Claims. (Cl. 23—259)

This invention relates to analyzers, and more particularly concerns automatic means for effecting chemical analyses.

Chemical analysis, particularly of the colorimetric type, is being increasedly used where large numbers of test samples are to be analyzed. This is particularly the case in clinical laboratories, but also takes place in industrial laboratories. Such analyses have been reduced to routine procedures where one or more chemical reagents are added at prescribed time intervals to the test specimens under set conditions, to produce a color whose intensity is measured in a colorimeter in relation to a color standard to give the final analysis.

However, even with such routine procedures, where large numbers of test samples are undergoing analysis, the manual operations incident to the handling of the test specimens, addition of reagents, etc., become quite tedious. This in turn may result in fatigue on the part of the technicians, giving rise to possible errors, particularly when the analyses are performed under unfavorable testing conditions. Thus, errors in pipetting, timing, etc. are not infrequent. Also, skilled technicians are employed and their rate of productive effort is not only limited but may also show a decrease toward the end of the day, thus showing a limited output of analyses per man.

While attempts have been made to facilitate such conventional manually performed analyses by automated mechanisms, known devices are of limited applicability and are of such a complex structure as to make the same quite expensive and therefore economically practicable only on a rather limited scale.

Accordingly, an object of this invention is to provide an improved automatic analyzer for use in performing one or more different analyses on a large number of test specimens.

A further object of this invention is to provide a chemical analyzer operable simultaneously on a plurality of test specimens to react the same with one or more chemical reagents in succession to provide a corresponding number of reacted specimens for colorimetric or other types of analysis.

Still another object of this invention is to provide an improved analyzer of the character described, wherein a plurality of test specimens are disposed in a given pattern and particularly related to certain reagent containers arranged in a given pattern so as to allow pipetting of portions of both test specimens and reagents into reaction containers in a given sequence of operations.

Yet another object of this invention is to provide an improved analyzer which correlates pipetting means; and containers for specimens and reagents for relative movement in a determined sequence of operations to allow for successive additions of one or more reagents to portions of the specimens.

Still another object of this invention is to provide an analyzer wherein a plurality of test specimens may undergo a series of different specific tests, each test involving one or more chemical reagents and determined portions of test specimens and reagents are automatically pipetted to reaction containers respectively corresponding to each of the different tests, the addition of the several reagents being timed as required and made in proper sequence so as to utilize the total time interval to best advantage.

Yet another object of this invention is to provide an automatic analyzer of relatively simple construction and including simple mechanism for effecting desired movements of parts thereof as desired; and which is readily operated for efficient performance of chemical tests on large numbers of clinical or commercial test specimens.

Other objects of this invention will in part be obvious and in part hereinafter pointed out.

The analyzer of the instant invention comprises essentially a pair of support members arranged for relative movement, with pipetting means arranged on one support member and containers for holding the test specimens and chemical reagents for the particular tests to be performed on the other support member. Reaction containers are provided for each analysis of each test specimen together with means for effecting appropriate movement of the support members to allow for successive pipetting of given quantities of test specimen and reagent into each reaction container.

Figure 1:
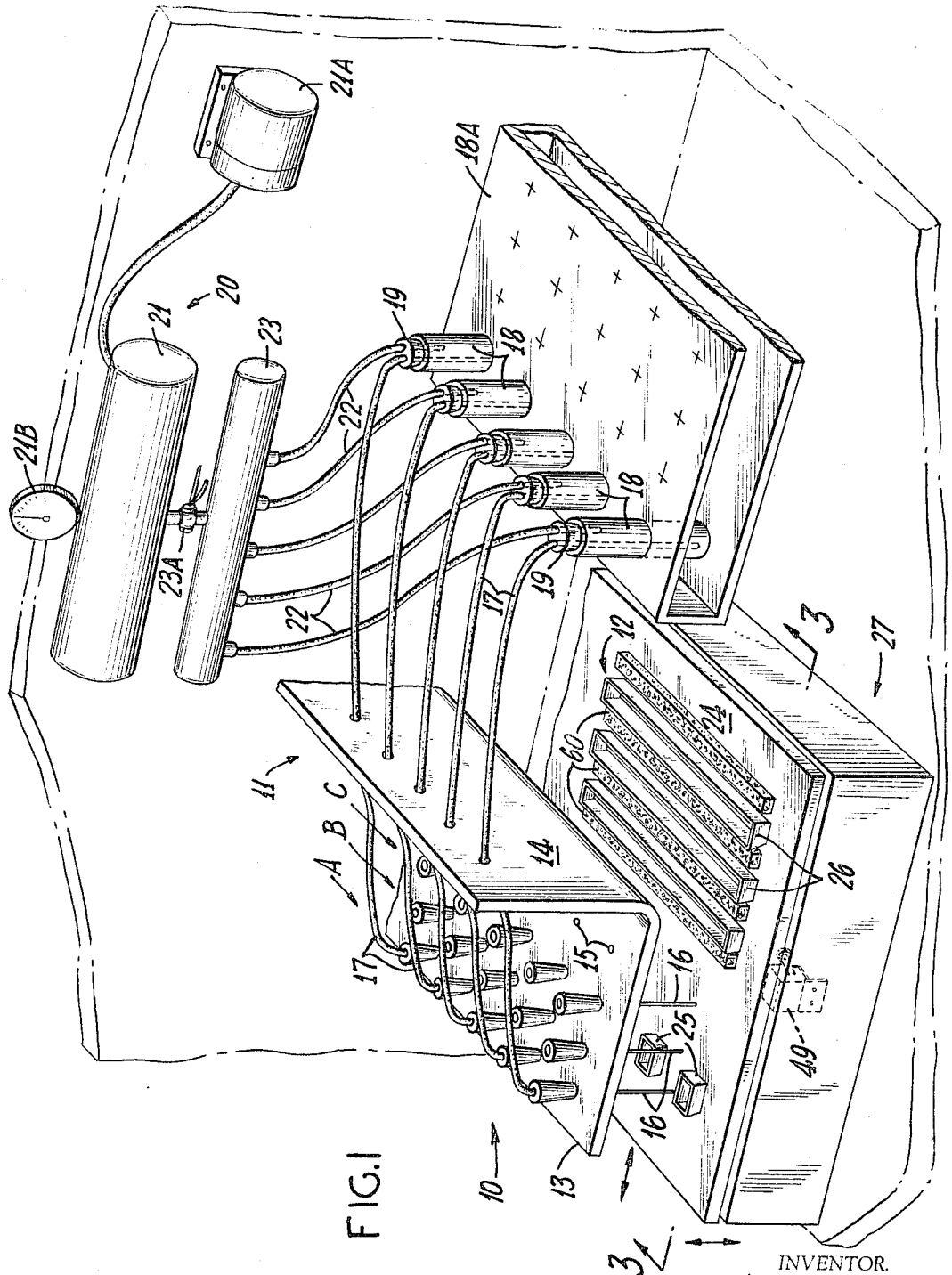
FIG. 1 is a perspective view of an analyzer embodying the invention.

Thus, as shown in FIG. 1, 10 designates an automatic analyzer embodying the invention. The same comprises a pipetting support member 11 spaced vertically above a test specimen and reagent support member 12. Support member 11 is suitably fixed against movement and comprises a bottom wall 13 and an upstanding side wall 14. Bottom wall 13 is formed with parallel rows of spaced openings 15 for mounting therein individual pipetting elements 16 which may take the form of fine bore hypodermic needles or capillary tubes, whose lower depending ends terminate in a common horizontal plane.

A flexible tubing 17 extends from the upper end of each pipetting needle 16, through an opening in side wall 14 to a reaction container such as a test tube 18, passing through a stopper 19 and terminating adjacent the lower end of the test tube.

Test tubes 18 are held in a suitable rack 18A. Aspirating means 20 for effecting reduced pressure in test tubes 18 is provided in the form of a low pressure tank 21 having associated therewith a motor operated vacuum pump 21A and gauge 21B. A series of flexible tubings 22, one for each test tube 18, extend from tank 21 by way of a manifold 23 and an intermediate solenoid operated valve 23A. The free ends of tubings 22 pass through the stoppers 19 and terminate at the upper end of test tubes 18.

Figure 2:
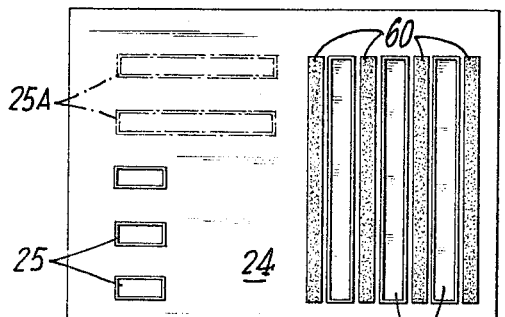
FIG. 2 is a top plan view of the movable platform forming a part of the device.

Pipetting elements 16 are adapted to selectively transfer measured quantities of test specimens and appropriate chemical reagents to test tubes 18. Accordingly, support member 12 comprises a platform 24 having mounted thereon a row of open top specimen containers 25 and elongated, parallel reagent containers 26, as shown in FIG. 2. Specimen containers 25 may be of limited size as shown in solid lines in FIG. 2, or may be elongated as shown in 25A in dotted lines.

It is understood that each of containers 25 or 25A is filled to a determined level with an identified liquid test specimen, which by way of example, may be blood serum. Thus, there may be as many such containers on platform 24 as the maximum number of test specimens which are to undergo simultaneous analysis. The spacing between containers 25, 25A is equal to the longitudinal spacing between pipetting elements 16 and containers 26 have a length somewhat longer than the longitudinal extent of each row of pipetting elements 16.

Platform 24 is arranged on a casing 27 which contains suitable mechanism 28, hereinafter described, for imparting selective vertical and horizontal movements to said platform in relation to pipetting support 11, thus, aligning selected containers 25 or 25A and 26 with longitudinal or transverse rows of pipetting elements 16, in accordance with a given sequence of operations appropriate to a given analysis to be performed on test specimens in containers 25 or 25A.

Figure 3:
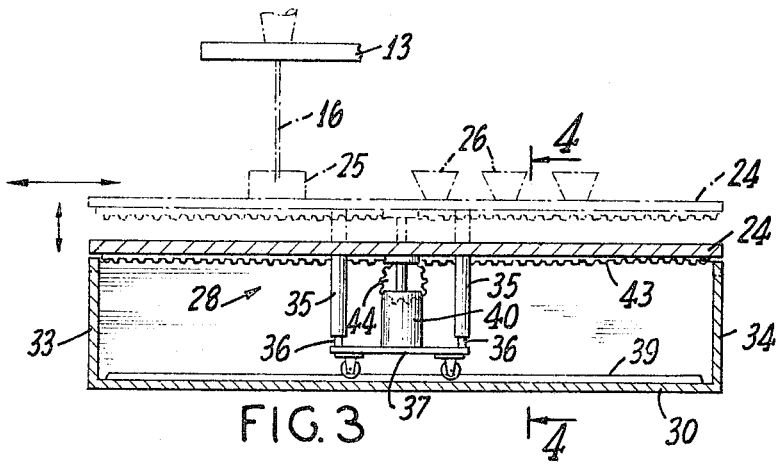
FIG. 3 is a sectional view taken on the line 3—3 of FIG. 1.
Figure 4:
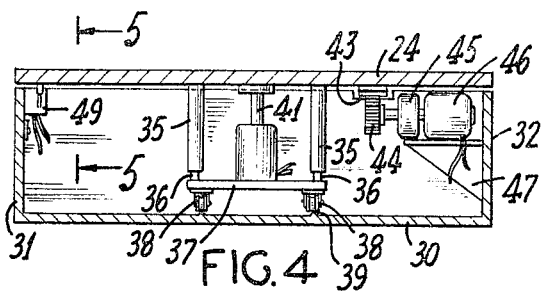
FIG. 4 is a vertical sectional view taken on the line 4—4 of FIG. 3.
Figure 5:
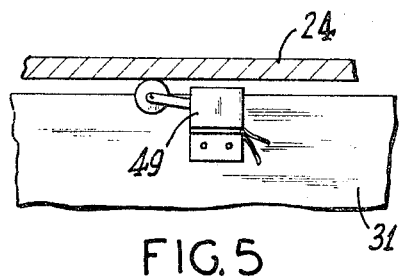
FIG. 5 is a sectional view taken on the line 5—5 of FIG. 4.

As shown in FIGS. 3–5, the mechanism 28 is disposed within casing 27 which comprises a bottom wall 30, side walls 31, 32 and end walls 33, 34. Platform 24 is disposed over the open top of casing 27 and has affixed to the underside thereof a set of spaced depending tubular guide members 35 which telescopically engage a set of stems 36 upstanding from a base member 37 which carries rollers 38 for moving the same over rails 39 in a longitudinal path between end walls 33, 34.

Figure 6:
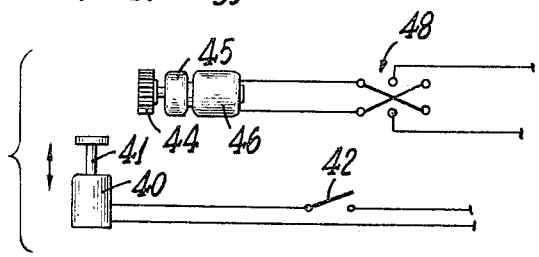
FIG. 6 is a schematic diagram of circuit connections for electrically operated components of the device.

Platform 24 is raised vertically relative to base member 37 by a solenoid 40 mounted on said base member and having its armature 41 secured to the underside of the platform. Energization of solenoid 40 through operation of switch means 42, FIG. 6, will raise the platform 24 to the elevated position indicated in dotted lines in FIG. 3.

Platform 24 may also be shifted in a horizontal plane to the left or right and to this end a rack 43 is affixed to the underside of the platform. A pinion gear 44 coupled to a reduction gear 45 driven by a small reversible motor 46, meshes with rack gear 43. The motor 46 is mounted on a bracket 47 extending from casing side wall 32. A reversing switch 48 controls the operation of motor 46, FIG. 6.

It will be apparent that when platform 24 is in its normal, lowered position, leaving containers 25, 26 clear of the lower ends of pipetting elements 16 and pinion gear 44 in mesh with rack gear 43; the motor 46 may be controlled by switch 48 to stop the slowly moving platform 24 in selected positions to align the specimen or reagent containers 25, 26 with the lower ends of a selected row of pipetting elements 16.

When platform 24 has been moved horizontally to a selected position, solenoid 40 is energized by way of switch 42 to raise platform 24 so that the lower ends of a selected row of pipetting elements 16 are immersed in the contents of aligned specimen or reagent containers 25 or 26. A microswitch 49 mounted on casing wall 31, FIGS. 4, 5 which is kept in an open position when platform 24 is in its lowered position, closes as the platform 24 rises, and being in circuit with solenoid operated valve 23A, is effective to connect each of the reaction containers 18 with aspirating means 20.

Thus, those pipetting elements 16 which are immersed in containers 25 or 26, are effective to transfer quantities of the contents thereof to respective reaction containers 18; the quantities being controlled by operation of switch 42 which when opened, deenergizes the solenoid 40 to lower platform 24 and to withdraw containers 25 or 26 from the lower ends of the pipetting elements 16. When platform 24 reaches its normal depressed position, microswitch 49 is moved to its open position, thus closing solenoid valve 23A and cutting off the aspirator 20.

It follows that measured quantities of specimen may be first transferred from containers 25 to the respective reaction containers and then measured quantities of reagent may be added to the specimen samples in containers 18. As the platform 24 moves downwardly toward its normal depressed position, the aspirator 20 is still operative for a short interval until switch 49 is actuated, causing air to be sucked into reaction containers 18 by way of the exposed tips of pipetting elements 16. This will produce a bubbling and mixing action in respect to the contents of containers 18.

It is understood, that platform 24 may be manipulated by suitable operation of switches 42, 48 to move the same in vertical and horizontal directions in a given sequence so as to transfer given quantities of different chemical reagents from respective reagent containers 26 for admixture with the sample specimen previously transferred to reaction containers 18, when the indicated analysis calls for more then one chemical reagent. Also, the additions of chemical reagent may be made at appropriate time intervals as called for by the analytical procedure involved.

By way of example, when a total protein analysis is to be made of blood serum specimens, using the single chemical reagent biuret held in a single reagent container 26; the platform 24 is moved to first bring a row of pipetting elements into alignment with the blood specimen containers 25, then raised to transfer 0.2 cc. of specimen from each container 25 to an associated reaction container 18. The transfer action may be calibrated to provide a transfer of 0.1 cc. per second, thus setting the first transfer operation at 2 seconds.

The platform 24 is then shifted to align the selected row of pipetting elements 16 into alignment with the single reagent container 26, raised to transfer biuret therefrom into the associated reaction containers 18; the dwell of the raised platform being over a period of 100 seconds to provide a transfer of 10 cc. of biuret into each reaction container 18 which already holds a sample of the blood serum. As the platform 24 is slowly lowered to its rest position, the continued operation of aspirator 20 will be effective to mix the contents of each reaction container 18, as previously described.

The individual reaction containers 18, respectively identified with their respective blood serum samples in specimen containers 25, may now be removed from rack 18A and placed in a colorimeter, not shown, for the usual comparator tests. Obviously any number of different blood specimens may be simultaneously tested, using a corresponding number of specimen containers 25 and reaction containers 18; as well as a corresponding number of pipetting elements 16.

If a given test specimen must be treated with more than one reagent, chemical buffer or diluent; then additional containers 26 are provided on platform 24 for respectively containing the necessary reagents, buffers and diluents. In such case, the movements of platform 24 are programmed by appropriate operation of mechanism 28 through switches 42, 48 at the proper time intervals to transfer in proper succession, required quantities of the specimen and treatment materials. Also, any time intervals between additions of reagents, etc., if require, are also provided by suitable dwells between movements of the platform 24.

In addition, analyzer 10 also permits a plurality of different tests to be performed on sepaarte portions respectively of each original test specimen. In such case, the successive additions of reagents, buffers, diluents or the like for each test are programmed in a manner such that the platform 24 is moved with a proper sequence of motions.

Thus, by way of example, assume that each of three specimens of blood serum is to be subjected to three separate and distinct tests, as follows: (1) total protein; (2) glutamic oxalacetic transaminase (GOT); and (3) glutamic pyruvic transaminase (GPT). Test (1) requires a single reagent-biuret; test (2) requires (a) GOT solution, (b) GOT color reagent, and (c) 0.4 N NaOH solution; and test (3) requires (*a*) GPT solution, (*b*) GPT color reagent, and (*c*) 0.4 N NaOH solution.

Figure 7:
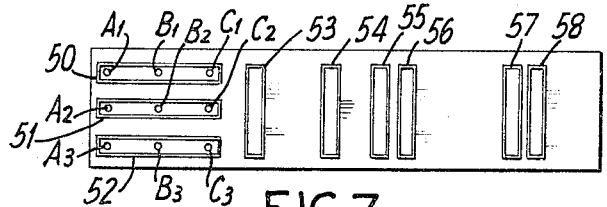
FIGS. 7–13 are diagrammatic representations of the successive operational movements of the analyzer in performing a plurality of different analyses on a plurality of specimens.

Accordingly, as shown in FIG. 7, platform 24 has disposed thereon elongated specimens containers 50, 51, 52 for receiving the respective blood specimens. Also on platforms are arranged a series of elongated reagent containers 53–58, which are in parallel relation and at right angles to the parallel specimen containers 50, 51, 52. The reagent containers 53–58 are respectively filled with biuret; GOT solution; GPT solution; GPT color reagent; GOT color reagent; and 0.4 N NaOH solution.

Inasmuch as the three blood specimens are each to be subjected to three tests; a total of nine tests are to be performed, requiring nine active reaction containers 18 and correspondingly, nine pipetting elements 16. Such pipetting elements are arranged on the support wall 13 in openings 15 thereof as three columns, with the pipetting elements identified as $A_1$, $A_2$, $A_3$; $B_1$, $B_2$, $B_3$ and $C_1$, $C_2$, $C_3$ disposed in the respective columns.

As indicated in FIG. 7, with platform 24 moved by action of mechanism 28, the specimen containers 50–52 are aligned with the pipetting elements, the containers being of a length such that pipetting elements $A_1$, $B_1$, $C_1$ can be immersed in the contents of container 50; elements $A_2$, $B_2$, $C_2$ in container 51 and elements $A_3$, $B_3$, $C_3$ in container 52.

Figure 8:
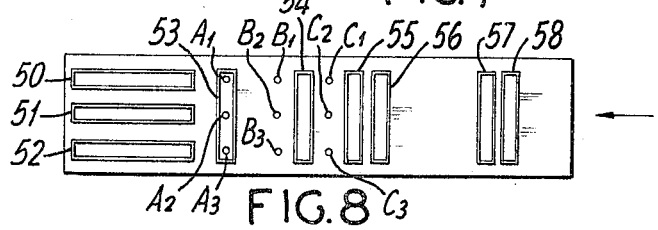

The aspirating means 20 is now operated, as previously described, to transfer 0.2 cc. of the blood specimens to the respectively associated reaction containers 18. The platform 24 is then lowered, and shifted to the left, looking at FIG. 8, to the extent that pipetting elements $A_1$, $A_2$, $A_3$ are now aligned with reagent container 53 which carries biuret. The spacing between the reagent containers 53–58 is such that when pipetting elements $A_1$–$A_3$ are aligned with reagent container 53, pipetting elements $B_1$–$B_3$ and $C_1$–$C_3$ are in offset relation to adjacent reagent containers.

The platform 24 is then raised and aspirating means 20 is operated to transfer 10 cc. of biuret to each of the reaction containers associated with pipetting elements $A_1$–$A_3$. This completes test (1) and the three reaction containers 18 involved may now be removed from rack 18A for insertion in the colorimeter, not shown, as previously described.

Figure 9:
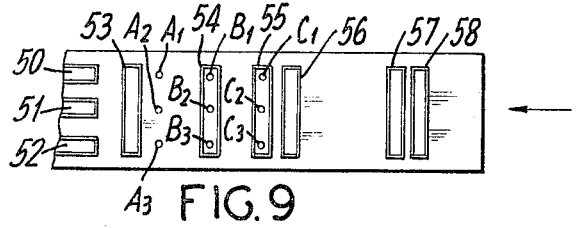

The mechanism 28 is now operated to shift platform 24 into the position indicated in FIG. 9, wherein, pipetting elements $B_1$–$B_3$ are aligned with reagent container 54 and elements $C_1$–$C_3$ are aligned with reagent container 55. The platform 24 is now raised and 1 cc. quantities of GOT solution are transferred to the reaction containers 18 associated with elements $B_1$–$B_3$ while 1 cc. quantities of GPT solution are transferred to the reaction containers associated with elements $C_1$–$C_3$.

Figure 10:
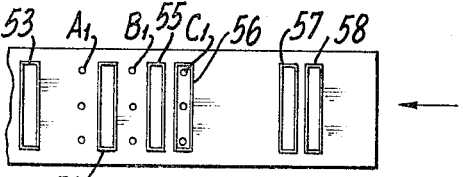

After a 30 minute rest interval, mechanism 28 is again operated to shift platform 24 to the position indicated in FIG. 10 wherein pipetting elements $C_1$–$C_3$ are now aligned with reagent container 56, and after raising the platform, aspirating means 20 is operated to transfer 1 cc. quantities of GPT color reagent to the reaction containers associated with pipetting elements $C_1$–$C_3$.

Figure 11:
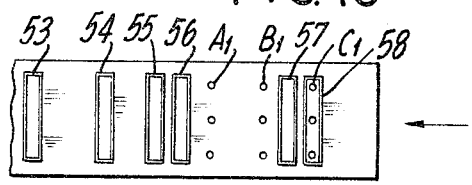

After a 15 minute interval, platform 24 is shifted to the position indicated in FIG. 11 wherein pipetting elements $C_1$–$C_3$ are now aligned with reagent container 58, and upon operation of mechanism 28 and aspirating means 20, 10 cc. quantities of 0.4 N NaOH solution is transferred to the reaction containers 18 associated with pipetting elements $C_1$–$C_3$. This now completes test (3) and the appropriate reaction containers 18 are removed from rack 18A for processing in the colorimeter, not shown.

Figure 12:
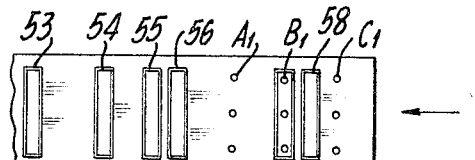
Figure 13:
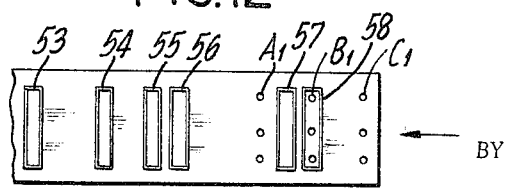

At this time, platform 24 is shifted to the position indicated in FIG. 12, wherein pipetting elements $B_1$–$B_3$ are aligned with reagent container 57, and 1 cc. quantities of GOT color reagent are transferred to the appropriate reaction containers. Finally, platform 24 is shifted to the position indicated in FIG. 13, wherein pipetting elements $B_1$–$B_3$ are aligned with reagent container 58 and 10 cc. quantities of 0.4 N NaOH solution are transferred to the associated reaction containers 18, thereby completing test (2). The reaction containers 18 are then processed in the colorimeter, not shown.

It is understood that while the arrangement and spacing of the pipetting elements 16 on support wall 13 is dictated by the disposition of openings 15 therein; such patterns and spacings may be varied to suit selected analyses to be performed and the programming of the same. Similarly, the spacing of the specimen containers 25 and the reagent containers 26, may be varied to suit the successive pipetting operations to be performed.

Thus, the spacings and patterns of both specimen and reagent containers may be correlated to suit any selected program of movements of platform 24, as dictated by the sequence of pipetting operations. In some instances, chemical reagent may be transferred simultaneously from two or more reagent containers to the appropriate reaction containers. Suitable means, not shown, may be used to secure the specimen containers 25 and reagent containers 26 to platform 24 in selectively spaced relationships.

Inasmuch as certain pipetting elements 16 may be inactive while other pipetting elements are activated to transfer quantities of specimen or reagent to reaction containers, means is provided for sealing the tips of the inactive pipetting elements 16. To this end, strips 60 of spongy soft material such as polyurethane foam are disposed on platform 24 between the reagent containers 26 to embed the pipette tips, thus sealing off the same to prevent loss of suction from aspirating means 20 by way of otherwise exposed tips.

While the movements of platform 24 are controlled by switches 42, 48; it will be apparent that mechanism 28 may be controlled by automatic means including the usual timing elements, relays and switches. Also, such control means may be programmed in a manner known in the art.

The reaction containers 18 may be heated or cooled after the addition of reagents, as dictated by the particular analysis, by placing the rack 18A carrying said containers in heated or cooled vessels, not shown, to provide necessary temperature conditions.

As various changes might be made in the embodiments of the invention herein disclosed without departing from the spirit of the invention, it is understood that all matter herein shown or described shall be deemed illustrative and not limiting except as set forth in the appended claims.

What is claimed is:

1. Analyzing apparatus comprising a pair of vertically spaced, substantially opposed support members, a plurality of pipetting elements mounted on the upper support member in predetermined spaced relation to each other, a plurality of reaction containers, flexible tubing connecting each pipetting element with an associated reaction container, a plurality of individual open top test specimen containers on the lower support member and in a spaced arrangement to dispose said specimen containers in opposed relation to the respective pipetting elements when said support members are in one relative position, at least one open top reagent container on said lower support member and located to dispose each of said pipetting elements in opposed relation to said reagent container when said support members are in another relative position, aspirating means connected to each of said reaction containers, first drive means for moving said lower support member horizontally and first control means for said first drive means operative to locate said lower support member in a position in which selected reagent, specimen and reaction containers are in vertical alignment with selected pipetting elements, second drive means for moving said lower support member vertically and second control means for said second drive means for raising and lowering said lower support member to bring said selected reagent, specimen and reaction containers into operative relation to said vertically aligned pipetting elements, said first and second control means being operable in a predetermined sequence and time pattern to effect successive insertion and withdrawal of said selected pipetting elements relative to said selected reagent, specimen and reaction containers and with concomitant operation of said aspirating means to successively transfer measured amounts of the contents of said specimen and reagent containers to the respective reaction containers.

2. Apparatus as in claim 1 wherein said pipetting elements are arranged in a row, said specimen containers being arranged in a row for respective alignment with said pipetting elements with said support members in said one relative position, and said reagent container is in alignment with said row of pipetting elements with said support members in the other relative position thereof.

3. Apparatus as in claim 1, wherein said aspirating means comprises suction means and a plurality of flexible tubings extending from said suction means respectively to each of said reaction containers.

4. Analyzer means as in claim 1 wherein the terminal end of said tubing extends within said reaction container means to a point adjacent the bottom thereof, and said pressure reducing means includes tubing extending therefrom to the upper portion of said reaction container means whereby withdrawal of said pipetting means from the contents of said reagent container means while said pressure reducing means continues its operation will cause air bubbling in the contents of said reaction container means to admix the same.

5. Automatic analyzer means comprising a pair of vertically spaced, opposed support members, pipetting means mounted on the upper support member and a plurality of open top containers mounted on the lower support member, said pipetting means comprising a plurality of parallel rows of spaced pipetting elements in depending relation from said upper support member, said open top containers comprising a set of specimen containers and a set of reagent containers, the set of specimen containers being in a disposition whereby each of the laterally related pipetting elements in the adjacent rows thereof are aligned with a single specimen container when said support members are in one relative position, said reagent containers being elongated and arranged in parallel whereby each pipetting element in a single row thereof is aligned with a selected reagent container when said support members are in other relative positions thereof, first drive means for moving said lower support member horizontally and first control means for said first drive means, second drive means for moving said lower support member vertically and second control means for said second drive means, said first and second control means being operable in a predetermined sequence and time pattern whereby to successively dip said pipetting elements into the contents of said specimen and reagent containers, a plurality of reaction containers, tubing means connecting each pipetting element with a single reaction container associated therewith, suction means for transferring a determined quantity of the contents of said specimen and reagent containers by each pipetting element to the reaction container associated therewith.

6. Analyzer apparatus comprising a pair of opposed support members, a plurality of pipetting elements on the upper support member, a plurality of specimen containers on the lower support member, a plurality of reagent containers on the lower support member, a reaction container for each pipetting element, tubing means connecting each pipetting element and an associated reaction container, means for reducing the pressure of said reaction containers, means for moving said lower support member horizontally and vertically relative to the upper support member, means for controlling the operation of said moving means to (1) locate said lower support member in positions relative to said upper support member to align said pipetting elements selectively with said specimen containers or said reagent containers, and (2) to move said lower support member toward and away from said upper support member to successively dip said pipetting elements into the contents of said specimen or reagent containers and to then remove said pipetting elements therefrom.

7. Apparatus as in claim 1 wherein said pipetting means comprises a plurality of pipetting elements arranged in spaced rectilinear relation, a reaction container for each pipetting element, conduit means connecting each pipetting element with its associated reaction container, said specimen container means comprising a plurality of specimen containers arranged in spaced rectilinear relation for respective alignment with said pipetting elements, said reagent container means being elongated and of a length to permit the simultaneous immersion of the tip portions of said pipetting elements into the liquid contents thereof upon alignment of said reagent container means with said pipetting elements.

8. Apparatus as in claim 1 and further including means for controlling the operation of said aspirating means in response to the raised and lowered movements of said lower support member.

References Cited by the Examiner
UNITED STATES PATENTS

| 3,143,393 | 8/1964 | De Seguin Des Hons | 23—253 |
| 3,193,359 | 7/1965 | Baruch et al. | 23—259 |

MORRIS O. WOLK, *Primary Examiner.*

JAMES H. TAYMAN, Jr., *Examiner.*